Nov. 9, 1965     B. C. BERGUM     3,216,860

ELECTRIC STORAGE BATTERY ELECTRODE ASSEMBLY

Filed July 5, 1963

United States Patent Office 3,216,860
Patented Nov. 9, 1965

3,216,860
ELECTRIC STORAGE BATTERY ELECTRODE
ASSEMBLY
Bernard C. Bergum, Black Earth, Wis., assignor to The
Electric Storage Battery Company, a corporation of
New Jersey
Filed July 5, 1963, Ser. No. 292,960
10 Claims. (Cl. 136—68)

This invention relates to an electric storage battery electrode assembly, and in particular, it relates to an improved electrode assembly which has a particularly strong and rugged construction.

Despite the fact that small, hermetically sealed, alkaline, electric storage cells, commonly called button cells, have been commercially available for several years, there are still many problems associated with the manufacture and operation of small sealed cells. It is well known that gases are often evolved during the operation of the cells, which gases must be absorbed by the electrochemical system or else result in the development of seal leaks and/or the bursting of the cell. It is known in the art that electrodes for small sealed cells may be prepared by encapsulating electrochemically active material in woven mesh baskets which enables evolved gases to be absorbed by one or more electrodes. These electrodes are expensive, difficult to manufacture, and the electrodes (especially positive electrodes) grow during cycling of the cell which causes the active material contact with the mesh basket and from particle to particle to become discontinuous. This results in a great increase in the internal cell electrical resistance.

It is an object of this invention to provide an electrode assembly having a particularly strong and rugged construction.

Another object of this invention is to provide an electrode assembly which maintains good electrical contact with the electrochemically active material despite growth of the electrode upon cycling.

Still another object of the invention is to provide an electrode assembly which may be readily manufactured, rapidly assembled, and which may be manufactured automatically.

A further object of this invention is to provide an electrode assembly which effectively prevents the migration of electrode active material.

Other objects and advantages of this invention will be apparent to those skilled in the art in view of the description which follows, and in particular by reference to the drawings in which.

Figure 1:
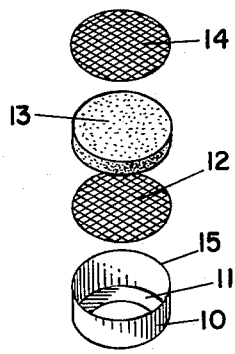
FIGURE 1 illustrates parts of an electrode in accordance with one embodiment of this invention prior to their assembly.

It has been discovered that an electrode assembly utilizing a metallic edge clamp having at least one aperture and one or two porous active material retainers encapsulating an active material pellet can be readily manufactured and assembled and is a particularly strong and rugged type of electrode construction. Such an electrode construction can be used for either a positive electrode or negative electrode or both, and is particularly useful for electrodes which undergo substantial growth during use. It has been found that this type of electrode construction is particularly useful for preparing electrodes to be used in small, hermetically sealed, electric storage cells.

The particular elements of an electrode assembly in accordance with this invention include a metallic edge clamp having at least one aperture, electrochemically active material and a porous active material retainer for each aperture. The edge clamp may be a ring having two apertures, preferably with an inward lip on one edge of the ring, or it may be shaped like a can having only one opening. It should be noted that throughout this specification the electrode assemblies will be described for circular or disk-shaped cells since this is the cell shape which is commonly used, though other configurations are within the scope of this invention. In assembling an electrode in accordance with one embodiment of this invention, a porous active material retainer is inserted into an edge clamp ring having two apertures so as to abut and rest upon an inward lip formed on one edge of the ring. Then the electrochemically active material which may be compressed into a pellet or disk is inserted into the edge clamp ring and rests upon the porous retainer. A second porous active material retainer is placed upon the other face of the active material and then the edge clamp ring is crimped about the edges of the porous retainers so as to tightly bind the porous retainers to the active material, which contact is maintained despite the growth of the active material. In addition to the improved ease of assembly and the improved contact between the porous retainers and the active material, the metallic edge clamp replaces much of the expensive wire mesh screen currently used to form a basket encapsulation for button cell electrodes and thereby reduces the electrode cost.

The above description refers to the edge clamp ring as having an inward lip upon which one of the porous retainers rests. This lip is not essential but is preferred because it improves the ease of manufacture by enabling the porous retainers and the active material to be inserted into the edge clamp ring by dropping which procedure could easily be automated. Alternatively, if the edge clamp ring does not have an inward lip, the retainers and active material may be inserted in the edge clamp ring and held in position by means other than the lip, and then both edges of the ring may be crimped upon the porous retainers.

Instead of using two porous retainers to encapsulate the active material, it is possible to use only one. In this type of assembly, the edge clamp comprises a can-type container having an aperture at only one end. The active material may be inserted into the edge clamp can-type container and a porous retainer inserted upon the active material so as to separate it from the open end of the edge clamp. Thereafter, the edge of the edge clamp container may be crimped upon the porous retainer to hold it and the active material in place and in close contact.

The principal requirements of the porous active material retainers is that they have sufficient porosity to permit electrolyte to contact the active material and still retain the active material within the assembly, and also they should have sufficient strength to withstand pressure caused by active material growth and handling and activation processes. With respect to activation of electrodes, it is often necessary to charge and discharge electrodes to the point at which they violently evolve gases, which requires a particularly strong and rugged electrode. The porous retainers may be prepared from metallic screening, expanded metal, woven or braided metal, or non-metallic fibers, and non-metallic screening such as nylon and other plastics. In most instances, it is desireable that the porous retainer material be resistant to corrosion by the electrolyte. In the case of consumable anodes such as zinc or cadmium, the porous retainer material may be of the same material as the consumable anode. It is particularly preferred to use a porous retainer which is metallic, e.g., wire screening, for the maintenance of good electrical contact between the active material and the porous metallic retainer decreases the internal electrical resistance and helps to collect the current from the active material.

A further feature of an electrode assembly in accordance with this invention is the use of a membrane or diaphragm which prevents the migration of active material. Diaphragms which are impermeable to the migration therethrough of colloidal forms of electrode active material may be prepared by depositing a solid polyelectrolyte in the pores of a porous carrier. Diaphragms of this type are completely described in U.S. Patent No. 2,965,697 issued to Joseph C. Duddy on December 20, 1960, and assigned to the assignee of this invention. Such a diaphragm may be inserted between the porous retainer and the active material or between the porous retainer and the crimped edge clamp, and the side of the electrode containing the membrane should be placed facing the electrode of opposite polarity. If a dual apertured electrode is to be placed between electrodes of opposite polarity, a diphragm may be used on both sides.

Though particularly described as being useful in sealed, alkaline "button type" cells, the electrode assembly of this invention may be used in large or small, primary or secondary, sealed or unsealed, alkaline or acid cells, and for either positive or negative electrodes. Such an electrode assembly is particularly useful in alkaline cells of the silver-zinc, silver-cadmium and nickel-cadmium type. An electrode assembly utilizing one or more impermeable diaphragms as described above is particularly useful if the electrochemically active material contains silver, for silver readily migrates throughout an alkaline cell. In addition, the electrode assembly of this invention may be used in battery containers wherein a plurality of electrodes of the same polarity are electrically connected.

A better understanding of the electrode assemblies of this invention may be had by reference to the drawings. In FIGURE 1, which illustrates parts of an electrode in accordance with this invention prior to their assembly, there is shown an edge clamp ring 10 having an inward lip 11 along the bottom edge thereof. Into the edge clamp 10 there is inserted a wire mesh porous active material retainer 12 which rests on the inward lip 11 and on top of the porous retainer 12 there is inserted an electrochemically active material pellet 13. The pellet may be prepared by compressing active material powder. On top of the pellet 13, another wire mesh porous active material retainer 14 is inserted. Woven nickel screens of 120 mesh may be used as the porous active material retainers and the edge clamp may be prepared from nickel coated steel. After the porous retainers and active material pellets are in place, the top edge 15 of the edge clamp 10 and the inward lip 11 may be crimped or turned over to abut the porous retainers 14 and 12 so as to hold the electrode assembly in place and maintain contact between the porous retainers and the active material pellet.

Figure 2:
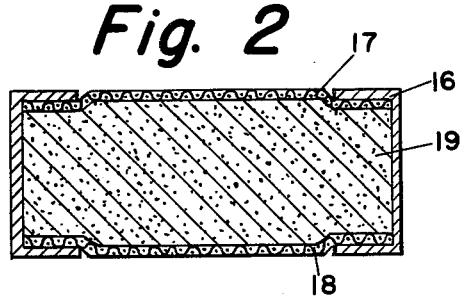
FIGURE 2 is a cross section of an electrode assembly in accordance with this invention.

FIGURE 2 illustrates an enlarged cross section of a preferred embodiment of this invention. In this particular electrode assembly, there is an edge clamp ring 16, two wire mesh screen retainers 17 and 18 and an active material pellet 19 inserted between the screens. It will be noted that the edges of the edge clamp ring 16 have been crimped or turned over to abut upon the wire screen retainers and hold them in close contact with the active material pellet. It is apparent that the good contact between the screen retainers and the active material pellet will be maintained even though the active material grows upon cycling the cell. In addition, it is evident that the dual screen and edge clamp assembly permits ready access to the active material by electrolyte and evolved gases, making this type of electrode assembly particularly useful in hermetically sealed alkaline cells.

Figure 3:
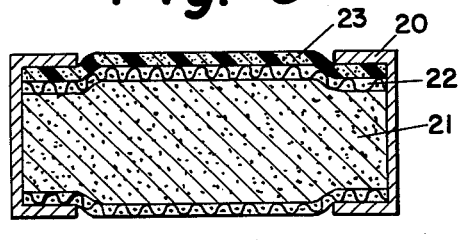
FIGURE 3 is a cross section of an electrode assembly similar to the assembly shown in FIGURE 2 which also contains a diaphragm.
Figure 4:
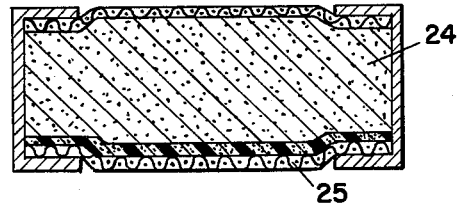
FIGURE 4 is a cross section of an electrode assembly similar to the assembly shown in FIGURE 3 in which the positioning of the diaphragm has been changed.

In FIGURE 3, the electrode assembly comprises an edge clamp 20 into which has been inserted an active material pellet 21 and a wire mesh screen retainer 22. Between the porous retainer 22 and the edge clamp 20 there is inserted an impermeable diphragm 23. It is preferred to have the impermeable diaphragm disposed between the edge clamp and the porous retainer, rather than between the active material pellet 24 and the porous retainer 25 as illustrated in FIGURE 4, because it is beneficial to have the electrically conductive retainer in electrical contact with the active material so that it can function as a current collector. When the electrode assembly depicted in FIGURE 3 is placed in a cell, the impermeable diaphragm 23 should be facing the separator and/or the electrode of opposite polarity in order to prevent migration of the active material 21 to the electrode of opposite polarity. This type of electrode assembly is particularly useful when the active material pellet 21 contains silver.

Figure 5:
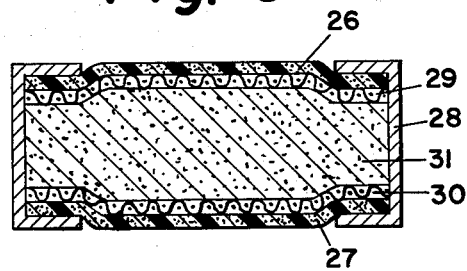
FIGURE 5 is a cross section of an electrode assembly similar to the assembly shown in FIGURE 2 which contains two diaphragms.

FIGURE 5 illustrates an electrode assembly similar to the assembly shown in FIGURE 2 which contains two impermeable diaphragms 26 and 27 interposed between the edge clamp 28 and the porous retainers 29 and 30. Such an assembly is useful when the electrode is to be placed between two electrodes of opposite polarity. It should be noted that the diaphragms 26 and 27 may be positioned between the active material pellet 31 and the porous retainers 29 and 30.

Figure 6:
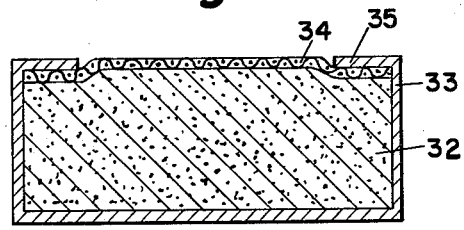
FIGURE 6 is a cross section of another embodiment of an electrode assembly in accordance with this invention.

FIGURE 6 illustrates another embodiment of an electrode assembly in accordance with this invention. An active material pellet 32 is placed in an edge clamp can-type container 33 having only one aperture. A wire mesh screen retainer 34 is inserted on top of the active material pellet and the top edge 35 of the can-type edge clamp is crimped or turned over upon the retainer 34. This holds the retainer and the active material pellet in place.

Figure 7:
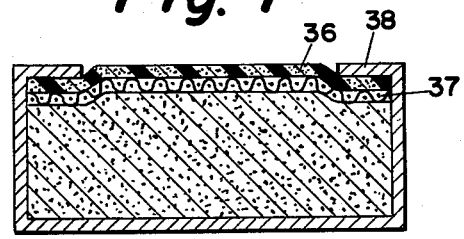
FIGURE 7 is a cross section of an electrode assembly similar to the assembly shown in FIGURE 6 which also contains a diaphragm.
Figure 8:
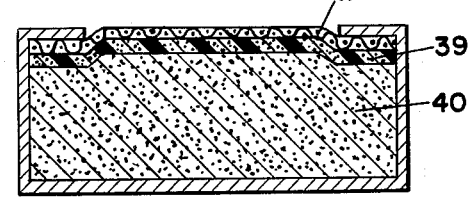
FIGURE 8 is a cross section of an electrode assembly similar to the assembly shown in FIGURE 7 in which the positioning of the diaphragm has been changed.

FIGURES 7 and 8 represent the embodiment illustrated in FIGURE 6 with the addition of an impermeable diaphragm to the electrode assembly. In FIGURE 7, the impermeable diaphragm 36 is inserted between the wire mesh retainer 37 and the edge clamp 38 which is preferred over the construction in FIGURE 8, wherein the impermeable membrane 39 is inserted between the active material pellet 40 and the wire mesh screen retainer 41.

Having completely described this invention, what is claimed is:

1. An electric storage battery electrode comprising at least one porous active material retainer and electrochemically active material which are held in close contact by a continuous edge clamp surrounding the active material and each porous retainer, said edge clamp being nonintegral with the porous retainer and having at least one aperture, said electrode having a porous active material retainer for each edge clamp aperture, said porous retainer being interposed between the active material and each aperture of the edge clamp, and each edge of said edge clamp being turned over upon each porous retainer so as to hold it in contact with the active material.

2. An electric storage battery electrode comprising electrochemically active material inserted between two porous active material retainers, which assembly is inserted in a continuous edge clamp which surrounds the active material and both porous retainers, said edge clamp being non-integral with the porous retainers and having two apertures, said porous retainers being interposed between the active material and each aperture of the edge clamp, the edges of said edge clamp being turned over upon the porous retainers so as to hold them in contact with the active material.

3. An electric storage battery electrode in accordance with claim 2 in which the porous active material retainers are electrically conductive wire screens.

4. An electric storage battery electrode in accordance with claim 2 in which an impermeable membrane containing a solid polyelectrolyte is inserted between at least one porous retainer and the turned over edge of the edge clamp so that the impermeable membrane completely covers the edge clamp aperture and is held in contact with the porous retainer by the turned over edge of the edge clamp.

5. An electric storage battery electrode in accordance with claim 2 in which an impermeable membrane containing a solid polyelectrolyte is inserted between the electrochemically active material and at least one of the porous retainers so that the impermeable membrane completely covers the edge clamp aperture and is held in contact with the active material by the porous retainer and the turned over edge of the edge clamp.

6. An electric storage battery electrode comprising electrochemically active material inserted between two porous, wire screen retainers, which assembly is inserted in a continuous edge clamp which surrounds the active material and both wire screen retainers, said edge clamp being non-integral with the wire screen retainers and having two apertures and an inward lip on one edge, said active material and wire screen retainers being inserted in the edge clamp so that one of the retainers is placed upon said inward lip, and the other edge of the edge clamp is turned over upon the other wire screen retainer so as to hold the active material and the wire screen retainers in place and in contact.

7. An electric storage battery electrode comprising electrochemically active material inserted into a can-type edge clamp having only one aperture, a porous active material retainer inserted upon the active material, said edge clamp surrounding the active material and the porous retainer, said active material enclosed by the can-type edge clamp in combination with the porous retainer, and the aperture edge of said edge clamp being turned over upon the porous retainer so as to hold it in contact with the active material.

8. An electric storage battery electrode in accordance with claim 7 in which the porous active material retainer is an electrically conductive wire screen.

9. An electric storage battery electrode in accordance with claim 7 in which an impermeable membrane containing a solid polyelectrolyte is inserted between the porous retainer and the turned over edge of the edge clamp so that the impermeable membrane completely covers the edge clamp aperture and is held in contact with the porous retainer by the turned over edge of the edge clamp.

10. An electric storage battery electrode in accordance with claim 7 in which an impermeable membrane containing a solid polyelectrolyte is inserted between the electrochemically active material and the porous retainer so that the impermeable membrane completely covers the edge clamp aperture and is held in contact with the active material by the porous retainer and the turned over edge of the edge clamp.

References Cited by the Examiner

UNITED STATES PATENTS

| | | | |
|---|---|---|---|
| 718,076 | 1/03 | Begeman | 136—166 |
| 738,942 | 9/03 | Redmon | 136—52 |
| 2,740,823 | 4/56 | Sexe et al. | 136—107 |
| 2,965,697 | 12/60 | Duddy | 136—146 |
| 3,007,993 | 11/61 | Haring | 136—100 |

WINSTON A. DOUGLAS, *Primary Examiner.*